(12) United States Patent
Unwin et al.

(10) Patent No.: US 10,006,935 B2
(45) Date of Patent: Jun. 26, 2018

(54) SCANNING ELECTROCHEMICAL MICROSCOPY

(71) Applicant: The University of Warwick, Coventry, Warwickshire (GB)

(72) Inventors: Patrick Robert Unwin, Rugby (GB); Kim Martin McKelvey, Swerford (GB)

(73) Assignee: The University of Warwick, Coventry West Midlands (GB)

( * ) Notice: Subject to any disclaimer, the term of this patent is extended or adjusted under 35 U.S.C. 154(b) by 386 days.

(21) Appl. No.: 14/398,707

(22) PCT Filed: May 1, 2013

(86) PCT No.: PCT/GB2013/051134
§ 371 (c)(1),
(2) Date: Nov. 3, 2014

(87) PCT Pub. No.: WO2013/164621
PCT Pub. Date: Nov. 7, 2013

(65) Prior Publication Data
US 2015/0129436 A1    May 14, 2015

(30) Foreign Application Priority Data

May 3, 2012 (GB) .................................. 1207775.6

(51) Int. Cl.
*G01Q 60/60* (2010.01)
*G01Q 40/00* (2010.01)
*B82Y 35/00* (2011.01)

(52) U.S. Cl.
CPC .............. *G01Q 60/60* (2013.01); *B82Y 35/00* (2013.01)

(58) Field of Classification Search
CPC ........ B82Y 35/00; G01Q 60/60; G01Q 60/38; G01Q 60/32; G01Q 30/14; G01Q 10/06;
(Continued)

(56) References Cited

U.S. PATENT DOCUMENTS

| | | | |
|---|---|---|---|
| 5,382,336 A | 1/1995 | Bard et al. | |
| 5,515,719 A * | 5/1996 | Lindsay | G01Q 10/06 73/105 |

(Continued)

FOREIGN PATENT DOCUMENTS

WO    WO 2011128694 A1    10/2011

OTHER PUBLICATIONS

McKelvey, et al., "Intermittent Contact-Scanning Electrochemical Microscopy (IC-SECM): A New Approach for Tip Positioning and Simultaneous Imaging of Interfacial Topography and Activity", Analytical Chemistry, vol. 82, No. 15, pp. 6334-6337, Aug. 1, 2010.
(Continued)

*Primary Examiner* — David A Vanore
(74) *Attorney, Agent, or Firm* — Klein, O'Neill & Singh, LLP

(57) ABSTRACT

A method of controlling a scanning electrochemical microscopy probe tip comprising the following steps: oscillating the scanning electrochemical microscopy probe tip relative to the surface of interest; moving the oscillating scanning electrochemical microscopy probe tip towards the surface of interest; detecting damping of an amplitude of the oscillation of the scanning electrochemical microscopy probe tip resulting from the scanning electrochemical microscopy probe tip coming into contact with the surface of interest at the first location; using the detected damping to detect the surface of interest; retracting the scanning electrochemical microscopy probe tip away from the surface of interest without first translating the scanning electrochemical microscopy probe tip along the surface of interest while the scanning electrochemical microscopy probe tip is in intermittent contact with the surface of interest. The method further comprises measuring electrochemical signals produced at the oscillating scanning electrochemical microscopy probe tip while mov-
(Continued)

ing the oscillating scanning electrochemical microscopy probe tip towards and/or away from the surface of interest.

10 Claims, 4 Drawing Sheets

(58) Field of Classification Search
CPC .............. Y10S 977/852; Y10S 977/863; Y10S 977/865
USPC .......... 850/1, 51, 57, 59; 977/852, 863, 865; 87/1, 51, 57, 59
See application file for complete search history.

(56) References Cited

U.S. PATENT DOCUMENTS

| | | | | |
|---|---|---|---|---|
| 6,245,204 B1* | 6/2001 | Lindsay | ................. | B82Y 35/00 204/400 |
| 7,156,965 B1* | 1/2007 | Li | ......................... | G01Q 60/60 204/400 |
| 9,316,613 B2* | 4/2016 | Unwin | ................... | B82Y 35/00 |
| 2015/0309071 A1* | 10/2015 | Proksch | ................ | G01Q 40/00 850/1 |

OTHER PUBLICATIONS

McKelvey, et al., "Quantitative Visualization of Molecular Transport through Porous Membranes: Enhanced Resolution and Contrast Using Intermittent Contact-Scanning Electrochemical Microscopy", Analytical Chemistry, vol. 83, No. 17, pp. 6447-6454, Sep. 1, 2011.
Lazenby, et al., "Hopping Intermittent Contact-Scanning Electrochemical Microscopy (HIC-SECM): Visualizing Interfacial Reactions and Fluxes from Surfaces to Bulk Solution", Analytical Chemistry, vol. 85, No. 5, pp. 2937-2944, Mar. 5, 2013.
International Search Report on related PCT application (PCT/GB2013/051134) from International Searching Authority (EPO) dated Jun. 13, 2013.
Written Opinion on related PCT application (PCT/GB2013/051134) from International Searching Authority (EPO) dated Jun. 13, 2013.

* cited by examiner

SCANNING ELECTROCHEMICAL MICROSCOPY

CROSS-REFERENCE TO RELATED APPLICATION

This application is a national phase filing, under 35 U.S.C. § 371(c), of International Application No. PCT/GB2013/051134, filed on May 1, 2013, which claims priority from GB Application No. 1207775.6, filed on May 3, 2012, the disclosures of which are incorporated herein by reference in their entireties.

FIELD OF THE INVENTION

This invention relates to scanning electrochemical microscopy.

BACKGROUND TO THE INVENTION

Scanning electrochemical microscopy (SECM) is a scanned probe microscopy technique which uses the electrochemical response of probe (typically an ultramicroelectrode (UME) with an active part of typically less than 25 µm) to provide information on the properties (topography or chemical activity) of a surface of interest (an interface, surface or phase) or for modification of a surface of interest (an interface, surface or phase). The SECM probe is immersed in a solution and used to detect chemical species (typically molecules or ions) which interact with the SECM probe or to generate chemical species (typically molecules or ions). Because the SECM probe detects or generates concentration and fluxes of the chemical species locally, the probe provides information on the properties of an interface, surface or phase at high spatial resolution. The SECM probe can be operated in amperometric, potentiometric or conductivity modes, amongst other possibilities. A wide variety of SECM probes have been described including solid metal electrodes, semiconducting electrodes, hybrid optical/electrode probes and liquid/liquid probes.

Conventional amperometric SECM (which forms the majority of applications) typically uses a metallic UME, although other probes are possible, operated in direct current (DC)-constant height (CH) mode. The UME is held at a potential to detect or electrolyze an analyte at a diffusion-limited rate and is positioned above the interface of interest. The probe is then moved laterally, at a constant height, across the interface of interest and the electrochemical response, as the measured current, of the probe is recorded as a function of the tip position. This provides a current image which depends on both the sample topography (distance between the probe and the interface) and surface activity.

Despite the impact of SECM in interfacial science, a significant challenge concerns absolute probe positioning. Intermittent contact SECM (IC-SECM) provides a method to resolve the probe to substrate separation independently of the probe electrochemical signal. This is not only valuable for amperometric probes, but also potentiometric probes, which can be used more easily in SECM with this positioning approach. In IC-SECM the SECM probe, usually aligned perpendicular with respect to the surface of interest, is oscillated vertically with respect to the substrate of interest, with small amplitude compared to the probe tip size. When the probe approaches a surface of interest, and eventually comes into intermittent contact with the substrate, the vertical oscillation of the probe is damped, and this damping is detected and used to maintain the probe tip to substrate separation.

IC-SECM was described in patent application PCT/GB2011/050747, the contents of which are incorporated herein by reference, and it was also reported in "Intermittent Contact-Scanning Electrochemical Microscopy (IC-SECM): A New Approach for Tip Positioning and Simultaneous Imaging of Interfacial Topography and Activity" (McKelvey, K.; Edwards, M. A.; Unwin, P. R. *Anal. Chem.* 2010, 82, 6334-6337). IC-SECM has been used to image the flow of electroactive species through dentin (see "Quantitative Visualization of Molecular Transport through Porous Membranes: Enhanced Resolution and Contrast using Intermittent Contact-Scanning Electrochemical Microscopy" McKelvey, K.; Snowden, M. E.; Peruffo, M.; Unwin, P. R. *Anal. Chem.* 2011, 83, 6447-54.)

SUMMARY OF THE INVENTION

A first aspect of the invention provides a method comprising:
controlling a scanning electrochemical microscopy probe tip to perform an approach/retract measurement routine at each of plural locations on a surface of interest in succession; and
translating the scanning electrochemical microscopy probe tip along the surface of interest between successive locations whilst the scanning electrochemical microscopy probe tip is not in intermittent contact with the surface of interest, wherein performing an approach/retract measurement routine comprises:
oscillating the scanning electrochemical microscopy probe tip relative to the surface of interest;
moving the oscillating scanning electrochemical microscopy probe tip towards the surface of interest;
detecting damping of an amplitude of the oscillation of the scanning electrochemical microscopy probe tip resulting from the scanning electrochemical microscopy probe tip coming into contact with the surface of interest at the first location;
using the detected damping to detect the surface of interest;
retracting the scanning electrochemical microscopy probe tip away from the surface of interest without first translating the scanning electrochemical microscopy probe tip along the surface of interest whilst the scanning electrochemical microscopy probe tip is in intermittent contact with the surface of interest; and
measuring electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

Successive locations may be approximately equally spaced or equally spaced.

Plural successive locations may be arranged in a straight line or an approximately straight line.

Plural locations may form multiple straight lines or approximate straight lines that are parallel or approximately parallel with one another. The plural locations may form a square grid. Successive locations may form a raster pattern in which locations on one line are successive to one another in one direction and locations on a next line are successive to one another in the opposite direction.

The method may comprise ceasing moving the probe tip towards the surface of interest in response to detecting intermittent contact between the probe tip and the surface of interest.

The method may comprise ceasing moving the probe tip whilst moving the probe tip towards the surface of interest and taking an electrochemical measurement whilst the probe tip is stationary.

The method may comprise ceasing moving the probe tip whilst retracting the probe tip from the surface of interest and taking an electrochemical measurement whilst the probe tip is stationary.

The method may comprise ceasing moving the probe tip between moving the probe tip towards the surface of interest and retracting the probe tip from the surface of interest and taking an electrochemical measurement whilst the probe tip is stationary.

The method may comprise translating the scanning electrochemical microscopy probe tip along the surface of interest whilst retracting the scanning electrochemical microscopy probe tip away from the surface of interest.

The invention also provides a computer program comprising machine readable instructions that when executed by scanning electrochemical microscopy apparatus control it to perform the method above.

A second aspect of the invention provides apparatus comprising:
  means for controlling a scanning electrochemical microscopy probe tip to perform an approach/retract measurement routine at each of plural locations on a surface of interest in succession; and
  means for translating the scanning electrochemical microscopy probe tip along the surface of interest between successive locations whilst the scanning microscopy probe tip is not in intermittent contact with the surface of interest,
wherein the means for controlling the scanning electrochemical microscopy probe tip to perform an approach/retract measurement routine comprises:
  means for oscillating the scanning electrochemical microscopy probe tip relative to the surface of interest;
  means for moving the oscillating scanning electrochemical microscopy probe tip towards the surface of interest;
  means for detecting damping of an amplitude of the oscillation of the scanning electrochemical microscopy probe tip resulting from the scanning electrochemical microscopy probe tip coming into contact with the surface of interest at the first location;
  means for using the detected damping to detect the surface of interest;
  means for retracting the scanning electrochemical microscopy probe tip away from the surface of interest without translating the scanning electrochemical microscopy probe tip along the surface of interest prior to retracting the scanning electrochemical microscopy probe tip away from the surface of interest; and
  means for measuring electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

Successive locations may be approximately equally spaced or equally spaced.

Plural successive locations may be arranged in a straight line or an approximately straight line.

Plural locations may form multiple straight lines or approximate straight lines that are parallel or approximately parallel with one another.

The plural locations may form a square grid.

Successive locations may form a raster pattern in which locations on one line are successive to one another in one direction and locations on a next line are successive to one another in the opposite direction.

The apparatus may comprise means for ceasing moving the probe tip towards the surface of interest in response to detecting intermittent contact between the probe tip and the surface of interest.

The apparatus may comprise means for ceasing moving the probe tip whilst moving the probe tip towards the surface of interest and taking an electrochemical measurement whilst the probe tip is stationary.

The apparatus may comprise means for ceasing moving the probe tip whilst retracting the probe tip from the surface of interest and taking an electrochemical measurement whilst the probe tip is stationary.

The apparatus may comprise means for ceasing moving the probe tip between moving the probe tip towards the surface of interest and retracting the probe tip from the surface of interest and taking an electrochemical measurement whilst the probe tip is stationary.

The apparatus may comprise means for translating the scanning electrochemical microscopy probe tip along the surface of interest whilst retracting the scanning electrochemical microscopy probe tip away from the surface of interest.

A third aspect of the specification provides apparatus configured:
  to control a scanning, electrochemical microscopy probe tip to perform an approach/retract measurement routine at each of plural locations on a surface of interest in succession; and
  to translate the scanning electrochemical microscopy probe tip along the surface of interest between successive locations whilst the scanning microscopy probe tip is not in intermittent contact with the surface of interest,
wherein the apparatus is configured to control the scanning electrochemical microscopy probe tip to perform an approach/retract measurement routine by being configured:
  to oscillate the scanning electrochemical microscopy probe tip relative to the surface of interest;
  to move the oscillating scanning electrochemical microscopy probe tip towards the surface of interest;
  to detect damping of an amplitude of the oscillation of the scanning electrochemical microscopy probe tip resulting from the scanning electrochemical microscopy probe tip coming into contact with the surface of interest at the first location;
  to use the detected damping to detect the surface of interest;
  to retract the scanning electrochemical microscopy probe tip away from the surface of interest without translating the scanning electrochemical microscopy probe tip along the surface of interest prior to retracting the scanning electrochemical microscopy probe tip away from the surface of interest; and
  to measure electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

A fourth aspect of the invention provides a computer readable medium having stored thereon machine readable code that when executed by a processor of a scanning microscopy apparatus causes the apparatus to perform a method comprising:

controlling a scanning electrochemical microscopy probe tip to perform an approach/retract measurement routine at each of plural locations on a surface of interest in succession; and translating the scanning electrochemical microscopy probe tip along the surface of interest between successive locations whilst the scanning electrochemical microscopy probe tip is not in intermittent contact with the surface of interest, wherein performing an approach/retract measurement routine comprises:

oscillating the scanning electrochemical microscopy probe tip relative to the surface of interest;

moving the oscillating scanning electrochemical microscopy probe tip towards the surface of interest;

detecting damping of an amplitude of the oscillation of the scanning electrochemical microscopy probe tip resulting from the scanning electrochemical microscopy probe tip coming into contact with the surface of interest at the first location;

using the detected damping to detect the surface of interest;

retracting the scanning electrochemical microscopy probe tip away from the surface of interest without first translating the scanning electrochemical microscopy probe tip along the surface of interest whilst the scanning electrochemical microscopy probe tip is in intermittent contact with the surface of interest; and measuring electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

A general discussion of salient features of the embodiments and associated effects and advantages now follows.

Embodiments of the invention, known as hopping intermittent contact SECM (HIC-SECM), is a new probe positioning and imaging method that is suitable for constructing multidimensional electrochemical (and topographic) maps of substrates of interest (interfaces, surfaces or phases) using IC-SECM principles.

Embodiments of the invention involve constructing multi-dimensional maps of the electrochemical and topographical features of a substrate of interest (an interface, surface or phase) using an SECM probe to make a series of approach/retract curves at a set of points covering a region of the surface of interest. The approach/retract curves are controlled using intermittent contact principles. The set of positions, over the region of interest, at which approach/retract curve measurements are made can be arranged in any pattern.

Within an approach/retract curve the SECM probe is translated towards the surface of interest and is halted when the surface is detected, by intermittent contact principles as the sustained damping of the oscillation amplitude of the SECM probe. The electrochemical response (amperometric, voltammetric, potentiometric, conductimetric, impedance, or other well known electrochemical methods) of the probe, and possibly at the surface of interest, is measured during the translation. The probe is then retracted a desired distance from the surface of interest and the electrochemical response, at the probe and possibly also the surface of interest, is measured during probe retraction. Electrochemical measurements can also be made, at the probe and possible the surface of interest, while the SECM probe is held stationary at the start, during or end of an approach/retract curve. The electrochemical response of the SECM probe may also be used to deliver chemical species to the surface of interest. This movement constitutes an approach/retract curve. The probe is then moved laterally, relative to the surface of interest, to the next position over the surface of interest and the next approach/retract curve is then measured.

By combining the electrochemical response with the positional information of the probe from the series of approach/retract curves, three dimensional electrochemical maps of the region above the surface of interest can be constructed. The electrochemical activity can be the direct amperometric, voltammetric, potentiometric, conductimetric, impedance, or other well known electrochemical measurements at the probe or the surface of interest. It can also constitute the oscillating components, amplitude and phase, of the amperometric, voltammetric, potentiometric, conductimetric, impedance, or other well known electrochemical measurements at the probe or the surface of interest. Two dimensional slices of the three dimensional map of the electrochemical responses may be made, such as normal or parallel to the surface of interest. The topography of the substrate can be constructed from the probe position when intermittent contact is detected.

The surface of interest in these embodiments is an interface between two substances, a surface of a solid or liquid, or a boundary between two phases (i.e. solid and liquid, liquid and gas, or solid and gas) of a substance, although it could be another surface.

All SECM probe types and all electrochemical configurations may be used in HIC-SECM, as it is the physical contact of the SECM probe with the surface which provides information on the probe tip to surface separation.

Compared to existing techniques, embodiments of this invention provide an imaging method which protects the probe, by minimising surface contact time, gives a bulk reference measurement at every lateral position (from the electrochemical response measured at the furthest position from the surface during approach and retract) and negates the need to maintain a constant contact of the SECM probe with the substrate of interest (as in IC-SECM, shear force-SECM and SECM-atomic force microscopy). The invention thus provides a significantly more robust method with which to map surfaces of interest than IC-SECM scanning mode (see patent application GB2011/050747). No additional equipment is needed, when compared to IC-SECM.

Embodiments of this invention differ from IC-SECM in that the images of electrochemical and topography is generated from a series of approach/retract curves, as opposed to keeping the probe tip in intermittent contact with the substrate as it is scanned across the substrate, as is the case with tradition IC-SECM scanning.

Embodiments of this invention differ from 4D shear force SECM (see "4D Shearforce-Based Constant-Distance Mode Scanning Electrochemical Microscopy" Nebel, M.; Eckhard, K.; Erichsen, T.; Schulte, A.; Schuhmann, W. *Analytical chemistry* 2010, 82, 7842-8.) in that shear force SECM oscillates the SECM tip parallel to the surface of interest, where HIC-SECM oscillates the probe normal the surface of interest. In addition shear force SECM uses the damping of the oscillation of the SECM probe due to the hydrodynamic forces between the SECM probe and the surface of interest, whereas HIC-SECM uses the physical interaction of the surface of interest with the probe tip to cause damping of the oscillation amplitude. Also shear force SECM requires specialized probes to function, where as HIC-SECM can utilise any SECM probe.

BRIEF DESCRIPTION OF THE DRAWINGS

Embodiments of the invention will now be described, by way of example only, with reference to the accompanying drawings in which.

DETAILED DESCRIPTION

Embodiments of the invention involve the generation of multidimensional maps of the electrochemical activity (and more generally concentration and flux) and topography of the surface of interest (an interface, surface or phase) from a series of approach/retract curves, while the SECM probe is operated in IC-SECM mode. At a series of different lateral positions over the surface of interest an approach/retract curve is carried out. At each different lateral position the SECM probe is translated towards the surface, while being oscillated normal to the surface. The SECM probe position and electrochemical activity is measured and recorded during this translation. When intermittent contact is detected the translation towards the surface is stopped and then the SECM probe is retracted a set distance away from the surface of interest. An additional electrochemical measurements may be made at the start, end, or at any point during an approach/retract curve, while the motion of the probe has been paused. For amperometric-voltammetric measurement, this can be at the same potential as during the approach curve, but can also be at a different potential.

Figure 1:
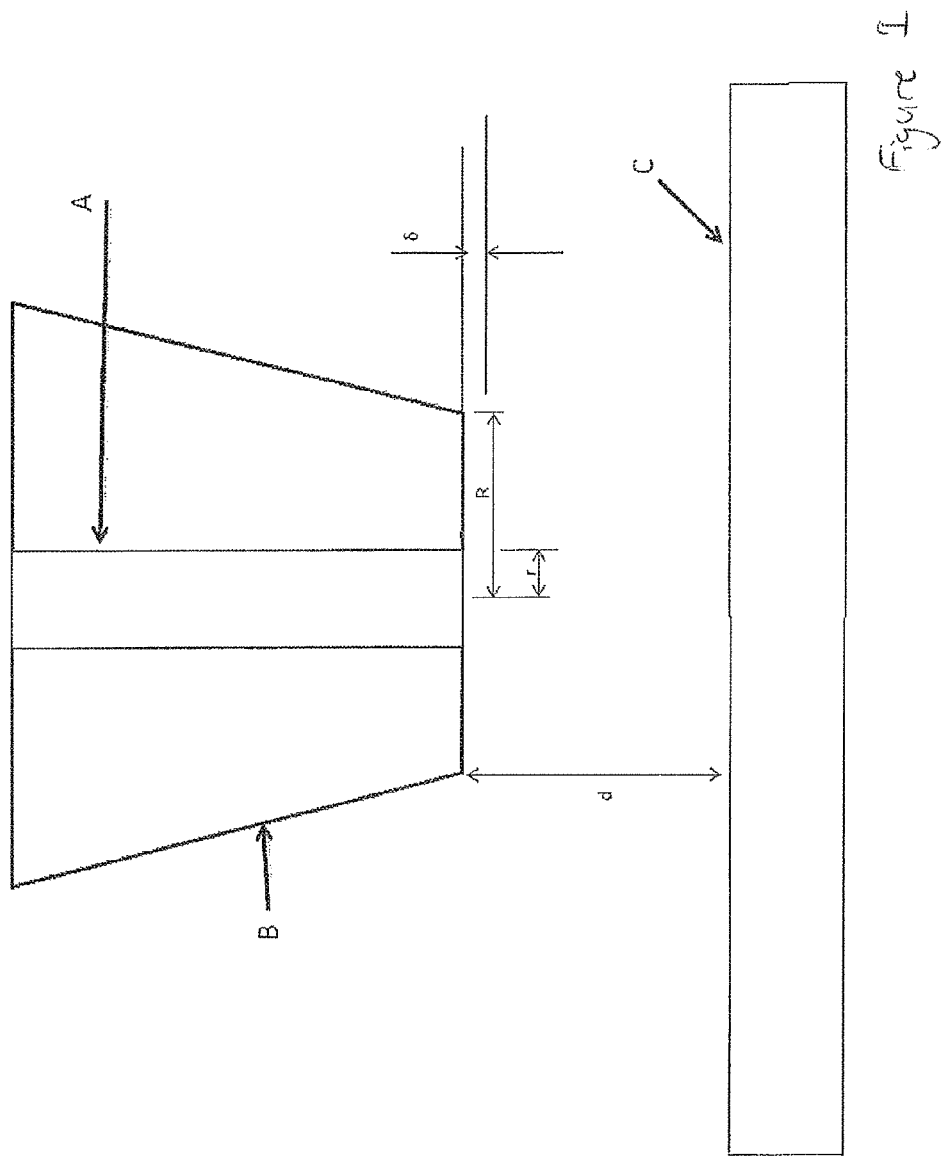
FIG. 1 shows a UME and a substrate surface as used with embodiments of the present invention.
Figure 3:
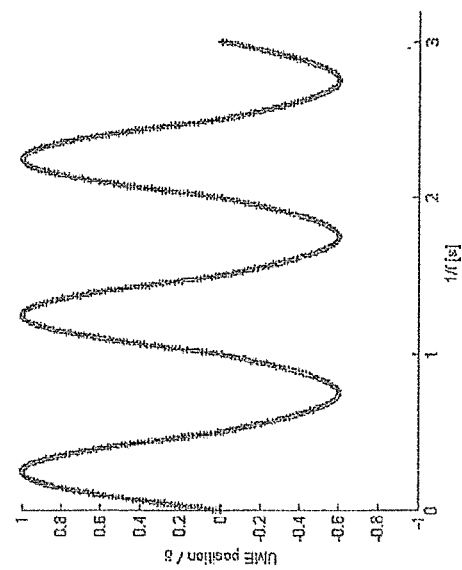
FIGS. 2 and 3 show movement of SECM tips according to embodiments of the invention.
Figure 2:
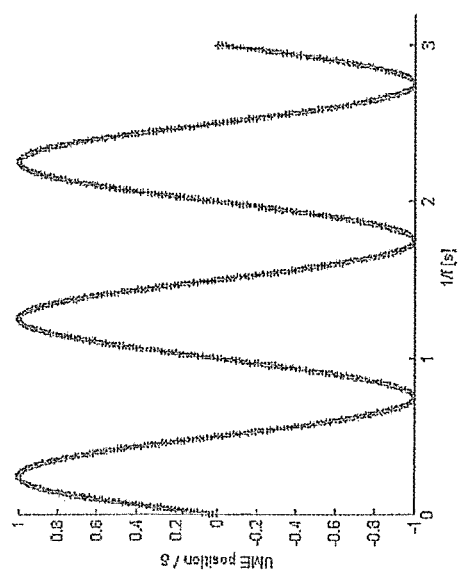
Figure 4:
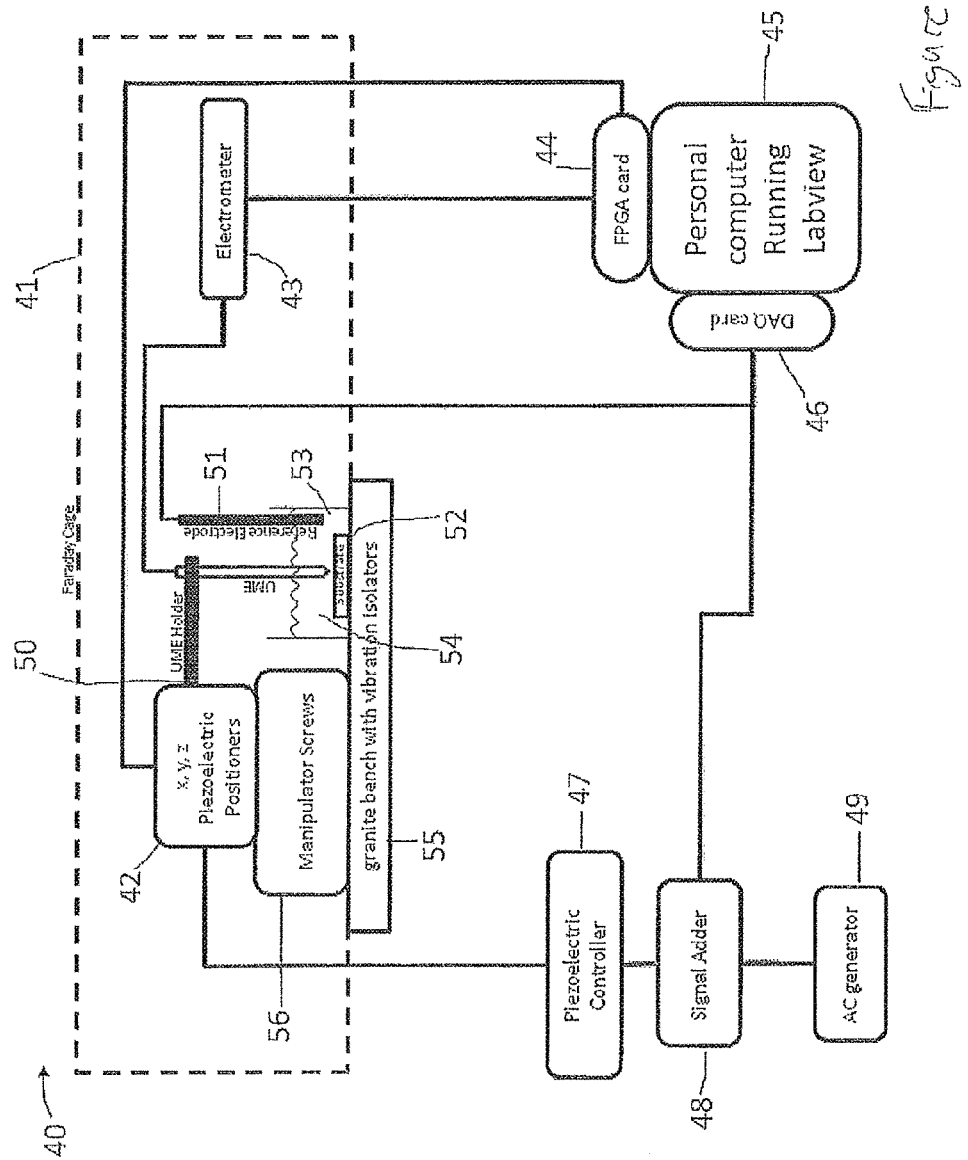
FIG. 4 shows an implementation of intermittent contact SECM embodying aspects of the invention.

FIG. 1 shows a cross-section of an UME and the oscillation of the UME. FIG. 2 shows the movement of the SECM tip when in bulk solution (i.e. not in contact with the surface). FIG. 3 shows the movement of the SECM tip when in intermittent contact with the substrate surface. Here, it can be seen that the uppermost half of the waveform, i.e. the parts above position o, are substantially the same as for FIG. 2, however the lowermost half of the waveform is damped by contact with the surface C. The damping is detected and provides absolute information on the tip-surface separation. This can be used as a measure of tip-surface separation for approach curve measurements (where the tip is translated towards or away from the substrate, usually in a perpendicular direction) and as a set point to maintain a fixed distance between the tip and substrate surface during imaging (where the tip and/or the substrate are moved laterally with respect to each other). The SECM tip electrochemical signal (e.g. current and/or potential) is measured throughout and provides information about the surface activity.

A detailed description of an implementation of the invention is now given. Embodiments of the invention are described with HIC-SECM used to map a surface using a raster scanning configuration while the SECM probe is an ultramicroelectrode (UME) operated in amperometric feedback mode.

Apparatus and Instrumentation

Coarse control of the SECM probe B (for example a Pt disk UME typically between 1 nm and 25 µm in radius), which is typically mounted perpendicular to the substrate surface is realised by a three-dimensional manual x,y,z stage controlled by manipulator screws 56. Note that other means of achieving this positioning are also possible. Fine control is realised, by three (x, y, z) piezoelectric positioners 42 fitted with strain gauge sensors. Other positional sensors can also be used. The piezoelectric positioners 42 are controlled by an amplifier/servo 47. The piezoelectric positioner amplifier/servo 47 is controlled using analogue signals through a data acquisition (DAQ) card 46 that is in turn controlled by a personal computer 45. The position of the piezoelectric positioners 42 is measured by the strain gauge sensors and recorded through the DAQ card 46 by the computer 45. An ac signal provided by a signal generator 49 is added to the z piezoelectric positioner 42 control by a signal adder 48.

The ac signal creates a sinusoidal oscillation in the height of the SECM tip about the average tip height. The ac signal is typically set to 70 Hz and typically at a magnitude to generate an oscillation of less than 2% of the active tip radius. Although the oscillation frequency here is 70 Hz, it may take any value between 5 and 100 000 Hz. The oscillation frequency may be between 5 and 2 000 Hz. The oscillation frequency may be between 30 and 110 Hz. The oscillation amplitude may between 0.1 nm and 20 µm. The oscillation amplitude may be between 1 nm and 5000 nm. The oscillation amplitude may be between 0.5 nm and 500 nm.

Instead of a sinusoidal oscillation, the signal generator may be configured to generate other wave forms. For instance, a square oscillation may be applied to the SECM tip. The oscillation frequency of the square wave may be between 5 and 100 000 Hz, or may take some other value. The oscillation amplitude may be between 0.5 nm and 20 µm. A sawtooth oscillation may be applied to the SECM tip. The oscillation frequency of the sawtooth signal may be between 5 and 100 000 Hz. Here, the oscillation amplitude may be between 0.5 nm and 20 µm.

The computer includes processing means, comprising one or more processors, memory means, comprising one or more memories, and a computer program stored in the memory means. The processing means, under control of the computer program, performs various actions that are described below; including measuring, detecting and controlling operations.

The SECM probe, coarse and fine control, and sample are mounted in a Faraday cage 41 which is mounted on a vibration isolation table 55. The UME B is operated in a two electrode arrangement with the UME B as the working electrode and a quasi-reference electrode 52, though other arrangements are possible. For example, the tip may be the working electrode in a three electrode amperometric/voltammetric arrangement with a counter and reference electrode, with the potential for the working electrode reaction and current measured with a potentiostat. For conducting substrates, a four electrode mode may be used, with two working electrodes (the substrate and the tip) and a counter and reference electrode.

The UME can be operated in a diffusion-limited configuration; with the UME held at a potential to electrolyse a target chemical species at a transport limited rate. Alternatively, the potential of the tip can be scanned or excited in various ways to record various current potential or current-time responses.

The potential of the UME B is controlled through the DAQ card 46 by the computer 45. The current generated by the UME B is measured by a current follower at the reference electrode (for the two electrode arrangement) and recorded through the DAQ card 46 by the computer 45.

The SECM probe can also be a potentiometric electrode, where it acts as an indicator electrode (e.g. ion selective electrode, pH electrode etc) along with a reference electrode.

The SECM probe may also be used with a second electrode to make conductimetric measurements.

The SECM probe may be a solid metal electrode (such as Pt, Ag, Au, Ir, Cu, or generally any solid metal), a carbon electrode (such as a glassy carbon, graphite, conducting (doped) diamond or any form of conducting carbon), a semiconductor electrode (such as a $WSe_2$, Si electrode) or a liquid/liquid probe (such as a liquid-membrane ion-selective electrode).

Hopping Mode Intermittent Contact SECM

An image of the substrate surface and/or its activity is generated from a series of approach/retract curves at different lateral positions over the scan area, α, of the surface of interest.

Prior to the first approach/retract curve measurement, the SECM probe is moved close to the surface of interest using the manipulator screws 56. The first approach/retract curve measurement is carried out by translating the SECM tip towards the substrate using the z piezoelectric positioner, typically at 0.1 μm $s^{-1}$, though this can be between 0.001 μm $s^{-1}$ and 10000 μm $s^{-1}$. Simultaneously the SECM tip is typically operated in IC-SECM at a frequency of 70 Hz with a magnitude of between 0.2 μm, though this can any value frequency between 5 and 100 000 Hz and any amplitude between 0.1 nm and 20 μm. The IC-SECM approach curve is terminated when intermittent contact is detected. Intermittent contact is a sustained decrease in the z piezoelectric positioner 42 strain gauge sensor (z-SGS) oscillation amplitude as compared to the z-SGS oscillation amplitude in the bulk solution (for example a 0.01% to 75% sustained decrease in the z-SGS oscillation amplitude). Once intermittent contact has been detected by the computer 45, translation by the z piezoelectric positioner 42 is halted. The SECM tip B is then retracted a distance, typically 5 times the active electrode radius though this can be between 0.001 and 1000 times the active electrode radius at a rate of typically 0.3 μm $s^{-1}$, though this can be between 0.001 μm $s^{-1}$ and 100000 μm $s^{-1}$, away from the surface.

The surface of interest in these embodiments is an interface between two substances, a surface of a solid or liquid, or a boundary between two phases (i.e. solid and liquid, liquid and gas, or solid and gas) of a substance, although it could be another surface such as a surface of a living cell or tissue.

As the UME tip B, which is biased at a potential to detect a species in bulk solution at a transport-limited rate, approaches an insulating substrate surface C the mean current decreases. When approached to a conducting substrate C the mean current may increase (if the tip generated product reaches the surface and is converted back to the form in bulk solution). The magnitude of the z-SGS oscillation remains constant for most of the approach curve, only changing when intermittent contact is made between the UME tip B and the substrate surface C.

The electrochemical response of the SECM tip is measured during the approach/retract curve, and portions of the curve at which measurements are taken is discussed below. The electrochemical response of the SECM tip may be the current generated at, or flowing through, the SECM tip when held at a potential to interact with a species of interest. Alternatively it may be the potential generated at the SECM tip when interacting with a species of interest. It may alternatively be the potential when a current is applied to the tip, via galvanostatic control. It may alternatively be a conductance current.

Once intermittent contact is detected, the SECM tip is retracted. The SECM tip is retracted to a suitable distance from the surface of interest, at which there is no intermittent contact. Retraction occurs in exactly or substantially the opposite direction to approach. The SECM tip continues to be oscillated whilst it is being retracted.

It will be understood that advancement and retraction here refer to movement of the average location of the tip, i.e. ignoring oscillation of the tip.

In some modes of operation, there is no significant translation of the SECM tip other than in the direction or approach/retraction whilst the approach/retract curve is produced. In these modes, there is no scanning or lateral movement of the SECM probe whilst it is in intermittent contact with the surface of interest In other modes of operation, the tip may be moved laterally as it is retracted from the surface. In modes of operation in which the tip is moved laterally during retraction, no significant lateral movement is made between the approach stage ending and the retraction stage starting, so lateral movement occurs only during retraction.

Once the SECM tip is fully retracted, the tip is moved laterally using the x and y piezoelectric positioners to the next approach/retract curve position along the x direction. The rate of movement of the probe as it is retracted is in this example 1 μm although this can for example be between 0.001 μm $s^{-1}$ and 10 000 μm $s^{-1}$. The separation in the x direction between adjacent measurement points is in this case is 2 μm, though this can for example be between 0.01 nm and 500 μm. The next approach/retract curve is then carried out starting from the final height of the previous approach/retract. This is repeated at multiple locations across the surface of interest.

There are a number of options for the stages of the approach/retract curve at which measurements are made.

In a first option, electrochemical measurements are made during the approach and during the retraction of the SECM tip. Advantageously, electrochemical measurements are made through the entire approach and the entire retraction, although measurements may be made through only part of the approach and/or part of the retraction In a second option, measurements are made as the SECM tip is retracted but not as it is advanced. Electrochemical measurements made during retraction can provide useful information. Advantageously, electrochemical measurements are made through the entire retraction, although measurements may be made through only part of the retraction.

In a third option, measurements are made as the SECM tip is advanced but not as it is retracted. Electrochemical measurements made during advance can provide useful information. Advantageously, electrochemical measurements are made through the entire advance, although measurements may be made through only part of the advance.

In the modes of operation in which the tip may be moved laterally as it is retracted from the surface, electrochemical measurements may be made whilst the SECM probe is being translated whilst being retracted. These measurements can provide useful information.

In any of the above-described options, electrochemical measurements may be made as the SECM probe is moved laterally between one measurement point and the next measurement point.

At the start, end or at any point during the approach/retract curve the movement of the SECM probe may be paused and additional electrochemical measurements made, such as a cyclic voltammogram, current-time transient, potential step transient among many possibilities. Pausing movement comprises ceasing the approach/retraction and may or may not include ceasing the oscillation of the probe.

Once all approach curves have been finished, or before if the user chooses, the SECM probe is retracted from the surface and the electrochemical and positional data are recorded on the computer.

Figure 5:
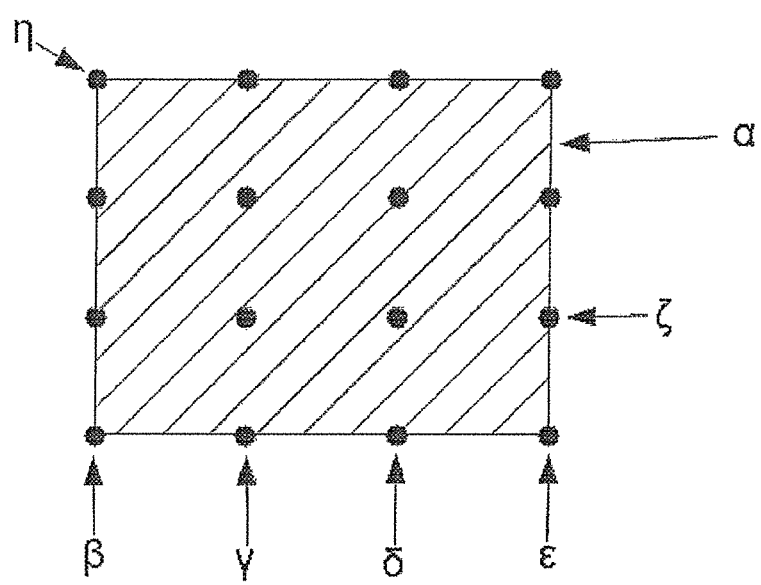
FIG. 5 shows a pattern of approach/retract curves employed in HIC-SECM according to aspects of the invention.

FIG. 5 shows an example raster pattern of approach/retract curves employed in hopping HIC-SECM, to scan the area of interest $\alpha$. An approach/retract curve is conducted at every point. The first approach/retract point is indicated as $\beta$, the second at $\gamma$, the third at $\delta$, the fourth at $\epsilon$, the fifth at $\zeta$ and so on until the last at $\eta$. Using a raster pattern allows measurements to be made at all points of interest with minimum lateral movement of the probe tip B.

The points at which approaches/retract curves are run are arranged in a raster scan pattern with a set distance between approach/retract curves (typically between 0.001 and 1000 times the active electrode radius), though other scan patterns are possible. Typically the first approach is carried out at the minimum x and minimum y coordinates of the scan $\beta$. The second approach is conducted at the minimum x position plus the set distance between points and the minimum y position $\gamma$. This pattern in continued until such time that the new x position is almost at the boundary of the area of interest. At this time the y position is incremented by the set distance, while the x position is not changed from the previous step $\zeta$. The position of the approaches is then determined by decrementing the x position by the set distance while keeping the y position constant.

This pattern of incrementing and decrementing the x position to the boundary of the area of interest and then incrementing the y position is continued until all of the area of interest has been covered. The hopping mode intermittent contact SECM scan in then completed. A multidimensional electrochemical image consisting of N by M approach/retract curves, where N is the number of independent x positions and M in the number of independent y positions, is thus constructed from the electrochemical signal and positional measurements during the approach/retract curve. These measurements can then be analysed to determine features of the surface of interest. These measurements can be used to generate a map of surface activity and/or topography. The measurements can also be used to map 3-D chemical speciation and fluxes.

It will be appreciated that, where a surface of interest is not planar across the area of interest, the z distance at which the surface is detected will be different for different x,y locations. As such, performing approach/retract measurements at plural locations allows the shape of the surface to be mapped.

Numerous advantages are provided by hopping IC-SECM. For instance, the possibility of probe damage is reduced, because surface time between the probe and the surface is reduced. Moreover, if the spacing between adjacent measurement points is sufficiently small, this can be achieved without any significant reduction in useful measurement data.

Furthermore, hopping can provide three-dimensional maps of electrochemical activity (concentration and flux) from which various images or approach curves at distinct points can be obtained. This can be compared to the provision of z-stacks in confocal microscopy.

Yet further, hopping can provide the desirable effect of a bulk reference measurement at every lateral position (from the electrochemical response measured at the furthest position from the surface during approach and retract).

Still further, hopping can negate the need to maintain a constant contact of the SECM probe with the substrate of interest, as can be required in IC-SECM, shear force-SECM and SECM-atomic force microscopy.

The invention is not limited to the above-described embodiments and is limited instead only by the appended claims. Various alternatives will be apparent to those skilled in the art. For instance, instead of a raster of sampling points in a square grid, the points may form a hexagonal grid or some other grid.

The invention claimed is:

1. A method comprising:
controlling a scanning electrochemical microscopy probe tip to perform an approach/retract measurement routine at each of plural locations on a surface of interest in succession; and
translating the scanning electrochemical microscopy probe tip along the surface of interest between successive locations whilst the scanning electrochemical microscopy probe tip is not in intermittent contact with the surface of interest,
wherein performing an approach/retract measurement routine comprises:
oscillating the scanning electrochemical microscopy probe tip relative to the surface of interest;
moving the oscillating scanning electrochemical microscopy probe tip towards the surface of interest;
detecting damping of an amplitude of the oscillation of the scanning electrochemical microscopy probe tip resulting from the scanning electrochemical microscopy probe tip coming into contact with the surface of interest at the first location;
using the detected damping to detect the surface of interest;
retracting the scanning electrochemical microscopy probe tip away from the surface of interest without first translating the scanning electrochemical microscopy probe tip along the surface of interest whilst the scanning electrochemical microscopy probe tip is in intermittent contact with the surface of interest; and
measuring electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

2. A method as claimed in claim 1, wherein successive locations are approximately equally spaced or equally spaced.

3. A method as claimed in claim 1, wherein plural successive locations are arranged in a straight line or an approximately straight line.

4. A method as claimed in claim 3, wherein plural locations form multiple straight lines or approximate straight lines that are parallel or approximately parallel with one another.

5. A method as claimed in claim 4, wherein the plural locations form a square grid.

6. A method as claimed in claim 4, wherein successive locations form a raster pattern in which locations on one line are successive to one another in one direction and locations on a next line are successive to one another in the opposite direction.

7. A method as claimed in claim 1, comprising ceasing moving the probe tip towards the surface of interest in response to detecting intermittent contact between the probe tip and the surface of interest.

8. A method as claimed in claim 1, comprising one of:
ceasing moving the probe tip whilst moving the probe tip towards the surface of interest and taking an electrochemical measurement whilst the probe tip is stationary,
ceasing moving the probe tip whilst retracting the probe tip from the surface of interest and taking an electrochemical measurement whilst the probe tip is stationary,
ceasing moving the probe tip between moving the probe tip towards the surface of interest and retracting the probe tip from the surface of interest and taking an electrochemical measurement whilst the probe tip is stationary.

9. A method as claimed in claim 1, comprising translating the scanning electrochemical microscopy probe tip along the surface of interest whilst retracting the scanning electrochemical microscopy probe tip away from the surface of interest.

10. A computer readable medium having stored thereon machine readable code that when executed by a processor of a scanning microscopy apparatus causes the apparatus to perform a method comprising:
controlling a scanning electrochemical microscopy probe tip to perform an approach/retract measurement routine at each of plural locations on a surface of interest in succession; and
translating the scanning electrochemical microscopy probe tip along the surface of interest between successive locations whilst the scanning electrochemical microscopy probe tip is not in intermittent contact with the surface of interest,
wherein performing an approach/retract measurement routine comprises:
oscillating the scanning electrochemical microscopy probe tip relative to the surface of interest;
moving the oscillating scanning electrochemical microscopy probe tip towards the surface of interest;
detecting damping of an amplitude of the oscillation of the scanning electrochemical microscopy probe tip resulting from the scanning electrochemical microscopy probe tip coming into contact with the surface of interest at the first location;
using the detected damping to detect the surface of interest;
retracting the scanning electrochemical microscopy probe tip away from the surface of interest without first translating the scanning electrochemical microscopy probe tip along the surface of interest whilst the scanning electrochemical microscopy probe tip is in intermittent contact with the surface of interest; and
measuring electrochemical signals produced at the oscillating scanning electrochemical microscopy probe tip whilst moving the oscillating scanning electrochemical microscopy probe tip towards the surface of interest and/or whilst retracting the scanning electrochemical microscopy probe tip away from the surface of interest.

* * * * *